(12) United States Patent
Gupta et al.

(10) Patent No.: US 11,993,295 B2
(45) Date of Patent: May 28, 2024

(54) MODULAR RAILCAR UNDERFRAME AND TOP CONTAINER

(71) Applicant: TRINITY RAIL GROUP, LLC, Dallas, TX (US)

(72) Inventors: Rajesh K. Gupta, Euless, TX (US); Konstantin I. Khenokh, Plano, TX (US); Suman Gachhadar, Frisco, TX (US); Percy Hoshang Elavia, Plano, TX (US); Matthew Gabriel Westlake, Dallas, TX (US)

(73) Assignee: TRINITY RAIL GROUP, LLC, Dallas, TX (US)

( * ) Notice: Subject to any disclaimer, the term of this patent is extended or adjusted under 35 U.S.C. 154(b) by 972 days.

(21) Appl. No.: 16/965,837

(22) PCT Filed: Jan. 29, 2019

(86) PCT No.: PCT/US2019/015629
§ 371 (c)(1),
(2) Date: Jul. 29, 2020

(87) PCT Pub. No.: WO2019/152390
PCT Pub. Date: Aug. 8, 2019

(65) Prior Publication Data
US 2021/0053592 A1    Feb. 25, 2021

Related U.S. Application Data

(60) Provisional application No. 62/623,727, filed on Jan. 30, 2018.

(51) Int. Cl.
*B61D 3/20* (2006.01)
*B61D 3/08* (2006.01)
*B61F 1/08* (2006.01)

(52) U.S. Cl.
CPC ............... *B61D 3/20* (2013.01); *B61D 3/08* (2013.01); *B61F 1/08* (2013.01)

(58) Field of Classification Search
CPC .. B60P 1/6481; B60P 1/64; B60P 7/06; B60P 7/08; B60P 7/13; B60P 12/00;
(Continued)

(56) References Cited

U.S. PATENT DOCUMENTS 3,358,616 A    12/1967  Brodhead
3,507,224 A     4/1970  Sweger
(Continued)

FOREIGN PATENT DOCUMENTS

AU    200218834 B2  *  2/2002  ............... B61D 3/20
AU    2002 18834 B2    4/2002
(Continued)

OTHER PUBLICATIONS

PCT Written Opinion of the International Seraching Authority issued for PCT/US2019/015629—dated May 6, 2019.
(Continued)

*Primary Examiner* — Robert J McCarry, Jr.
(74) *Attorney, Agent, or Firm* — Baker Botts L.L.P.

(57) ABSTRACT

According to some embodiments, a modular railcar comprises: a pair of trucks disposed near each end of the modular railcar; an underframe coupled to the pair of trucks and supported by the pair of trucks. The underframe comprises a plurality of coupling apparatus. The plurality of coupling apparatus are configured to couple a modular top container to the underframe. According to some embodiments, a modular top container comprises: a floor panel configured to transport a lading; and a plurality of coupling apparatus coupled to the floor panel. The plurality of coupling apparatus are configured to couple the modular top container to a modular railcar. The floor panel is configured to support
(Continued)

the weight of the lading when detached from the modular railcar.

16 Claims, 21 Drawing Sheets

(58) Field of Classification Search
CPC .. B60P 15/00; B61D 3/00; B61D 3/08; B61D 3/16; B61D 3/20; B61D 15/04
See application file for complete search history.

(56) References Cited

U.S. PATENT DOCUMENTS

| 7,441,809 B1* | 10/2008 | Coombs | B62D 65/04 |
| | | | 280/781 |
| 10,081,290 B2 | 9/2018 | Fohrenkamm et al. | |
| 2011/0226153 A1 | 9/2011 | Saxton et al. | |

FOREIGN PATENT DOCUMENTS

| FR | 1464895 | * 11/1965 | ............. B61D 3/005 |
| FR | 1 464 895 A | 1/1967 | |

OTHER PUBLICATIONS

PCT International Search Report issued for International application No. PCT/US2019/015629—dated May 6, 2019.
Railway Gazette International; Modular multi-function wagons on test—printed Jul. 15, 2020.
International Preliminary Report on Patentability for PCT Patent Application No. PCT/US2019/015629, dated Aug. 13, 2020; 8 pages.

* cited by examiner

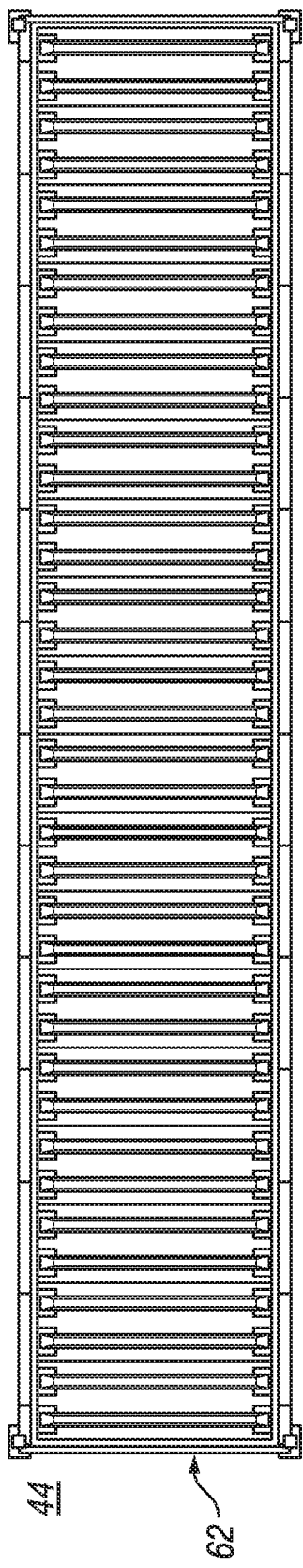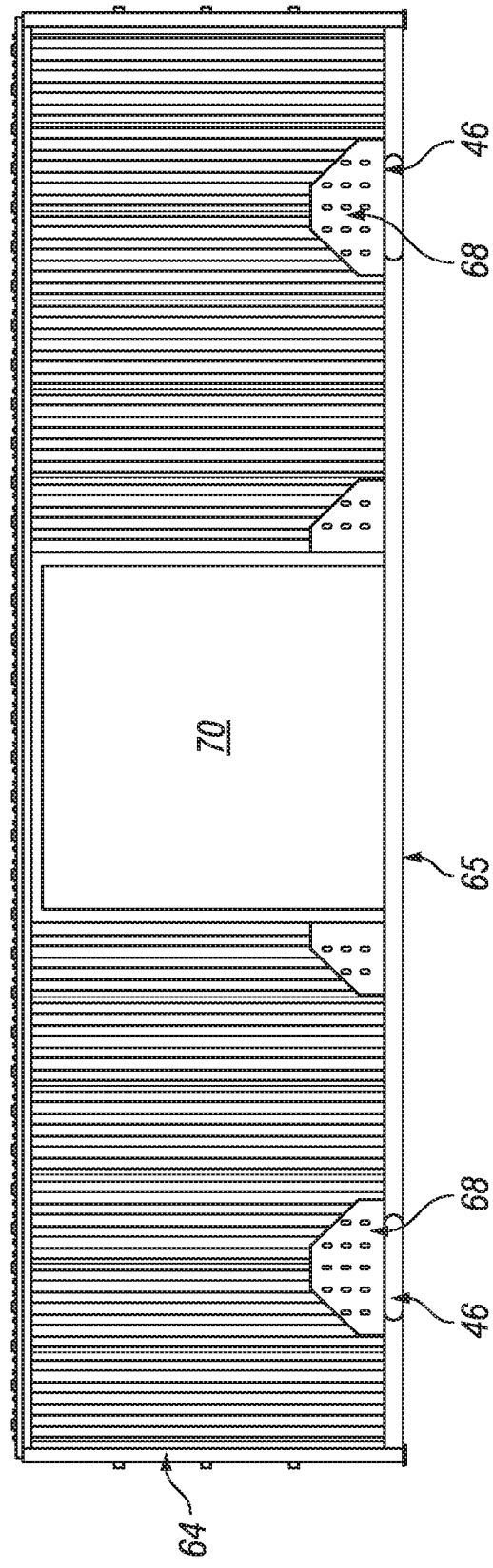
FIG. 6A
FIG. 6B

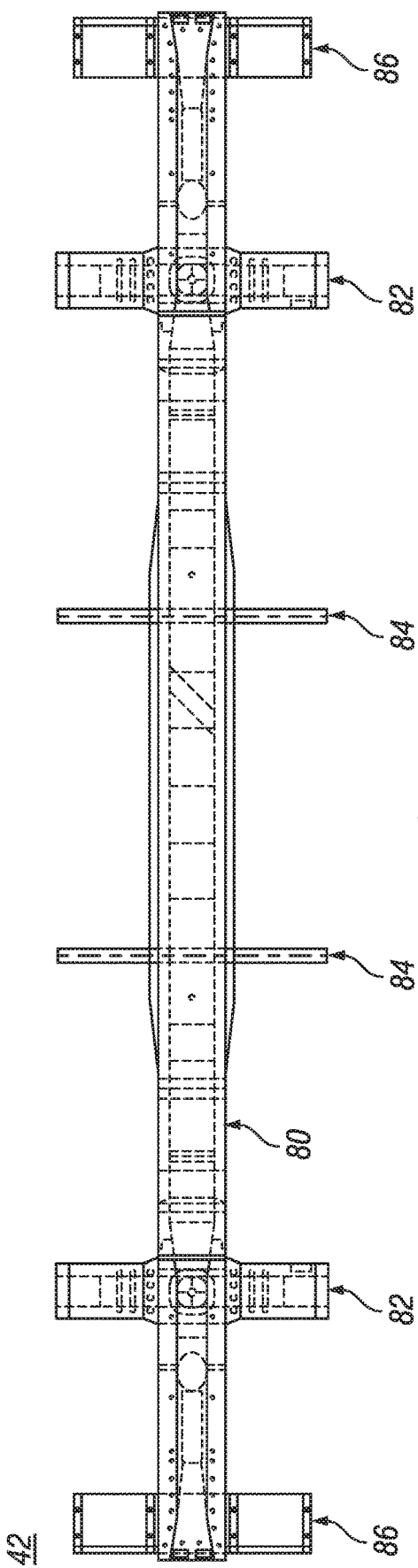
FIG. 7A
FIG. 7B

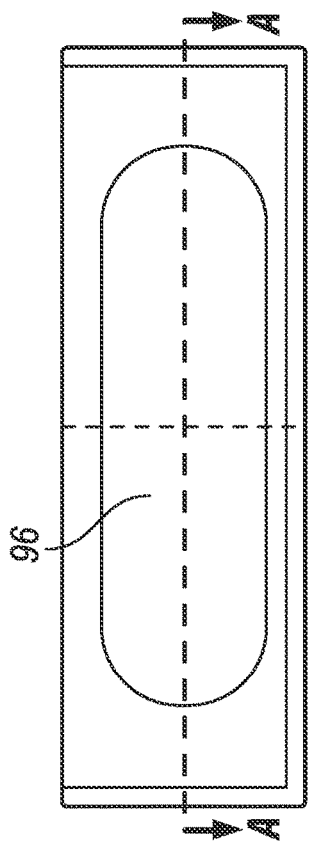
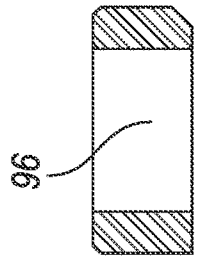
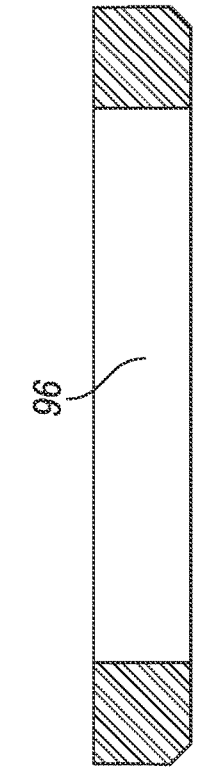

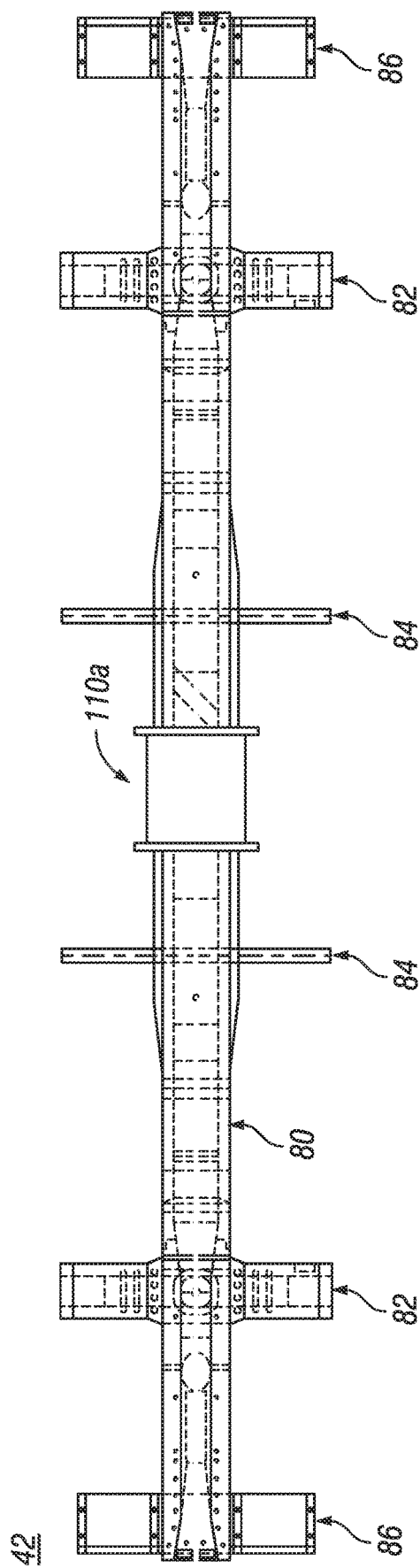
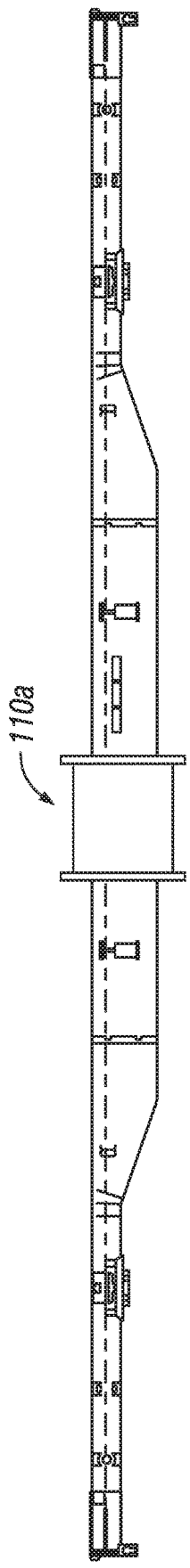
FIG. 15A
FIG. 15B

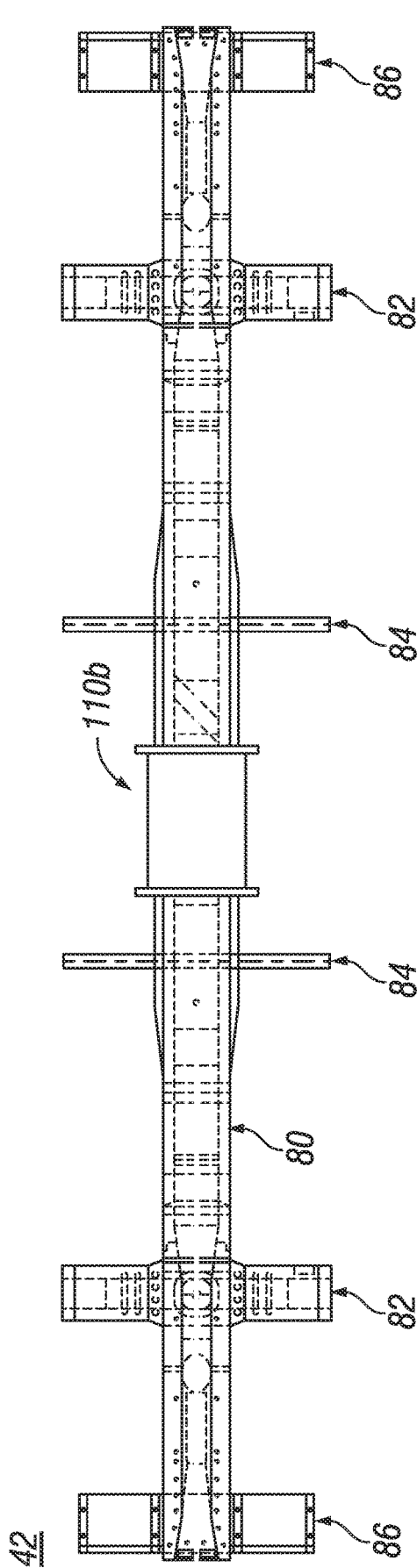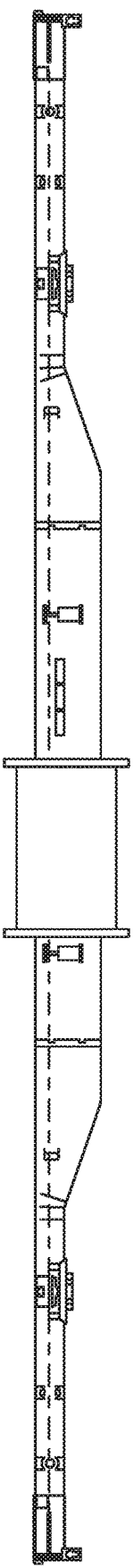
FIG. 15C
FIG. 15D

MODULAR RAILCAR UNDERFRAME AND TOP CONTAINER

PRIORITY

This nonprovisional application is a U.S. National Stage Filing under 35 U.S.C. § 371 of International Patent Application Serial No. PCT/US2019/015629 filed Jan. 29, 2019 and entitled "MODULAR RAILCAR UNDERFRAME AND TOP CONTAINER" which claims priority to U.S. Provisional Patent Application No. 62/623,727 filed Jan. 30, 2018 both of which are hereby incorporated by reference in their entirety.

TECHNICAL FIELD

This disclosure generally relates to railroad cars, and more particularly to a modular railcar with a common underframe that may be coupled with various top containers.

BACKGROUND

Railcars are generally classified by families, or types of cars, such as gondola, boxcar, hopper car, flatcar, etc. Within each family, particular railcars may be optimized for a specific commodity.

The boxcar family, for example, includes enclosed railcars generally used to carry freight. Various boxcars may have doors of varying size and operation. Boxcars may be optimized for carrying a wide range of loads such as palletized cement, auto parts, paper, cellulose pulp, and many other goods, which may result in boxcars of varying length and/or load bearing capacity. Specialty boxcars may include refrigerated and/or insulated boxcars.

The gondola car family, as another example, includes railcars generally with four walls and an open top for transporting loose bulk materials. Gondola cars may be optimized for transporting various ladings such as scrap metal, construction debris, gravel, and many other materials, which may result in gondola cars of varying length and/or load bearing capacity.

SUMMARY

According to some embodiments, a modular railcar comprises: a pair of trucks disposed near each end of the modular railcar; an underframe coupled to the pair of trucks and supported by the pair of trucks. The underframe comprises a plurality of coupling apparatus. The plurality of coupling apparatus are configured to couple a modular top container to the underframe.

In particular embodiments, the underframe comprises a center sill and one or more cross members coupled to the center sill. Each coupling apparatus of the plurality of coupling apparatus is disposed on the one or more cross members. The plurality of coupling apparatus may comprise a first subset of coupling apparatus disposed to couple a first type of top container to the underframe and a second subset of coupling apparatus disposed to couple a second type of top container to the underframe.

In particular embodiments, each coupling apparatus of the plurality of coupling apparatus comprises a protruding portion configured to couple with a recessed portion of a modular top container. The protruding portion of each coupling apparatus may be smaller than a corresponding recessed portion of the modular top container facilitating movement of the modular top container with respect to the underframe.

In particular embodiments, each coupling apparatus of the plurality of coupling apparatus comprises a recessed portion configured to couple with a protruding portion of a modular top container. The recessed portion of each coupling apparatus may be larger than a corresponding protruding portion of the modular top container facilitating movement of the modular top container with respect to the underframe.

In particular embodiments, each coupling apparatus of the plurality of coupling apparatus is configured to couple to a corner fitting of an international standards organization (ISO) intermodal shipping container.

In particular embodiments, the underframe comprises: a first underframe portion coupled to a first truck of the pair of trucks; a second underframe portion coupled to a second truck of the pair of trucks; and a removable extension portion coupling the first underframe portion to the second underframe portion. The removable extension portion may further comprise at least one of a brake line extension, an electrical line extension, a pneumatic line extension, and a hydraulic line extension.

According to some embodiments, a modular top container comprises: a floor panel configured to transport a lading; and a plurality of coupling apparatus coupled to the floor panel. The plurality of coupling apparatus are configured to couple the modular top container to a modular railcar. The floor panel is configured to support the weight of the lading when detached from the modular railcar.

In particular embodiments, the modular top container comprises a pair of side panels and a pair of end panels coupled to the floor panel. The floor panel, the pair of side panels, and the pair of end panels are configured to support the weight of the lading when detached from the modular railcar. The modular top container may further comprise a roof panel and one or more doors.

According to some embodiments, a method of coupling a modular top container and a modular railcar comprises providing a railcar. The railcar comprises a modular railcar comprising a pair of trucks disposed near each end of the modular railcar and an underframe coupled to the pair of trucks and supported by the pair of trucks. The underframe comprises a plurality of coupling apparatus. The plurality of coupling apparatus couple a first modular top container to the modular railcar. The first modular top container comprises a floor panel configured to transport a lading and a plurality of coupling apparatus coupled to the floor panel. The plurality of coupling apparatus couple the modular top container to the modular railcar. The floor panel is configured to support the weight of the lading when detached from the modular railcar. The method further comprises: uncoupling the first modular top container from the modular railcar; lifting the first modular top container off the modular railcar; placing a second modular top container onto the modular railcar; and coupling the second modular top container to the modular railcar.

In particular embodiments, uncoupling the first modular top container from the modular railcar comprises unbolting the first modular top container from the modular railcar, and coupling the second modular top container to the modular railcar comprises bolting the second modular top container to the modular railcar. The first modular top container may be a different length or of a different type than the second modular top container.

In particular embodiments, the underframe of the modular railcar comprises: a first underframe portion coupled to a first truck of the pair of trucks; a second underframe portion coupled to a second truck of the pair of trucks; and a first extension portion coupling the first underframe portion to the second underframe portion. The first extension portion comprises a first length. The method further comprises removing the first extension portion and replacing the first extension portion with a second extension portion. The second extension portion comprises a second length.

In particular embodiments, the first extension portion and the second extension portion each comprise at least one of a brake line extension, an electrical line extension, a pneumatic line extension, and a hydraulic line extension. Removing the first extension portion comprises disconnecting at least one of the brake line extension, the electrical line extension, the pneumatic line extension, and the hydraulic line extension of the first extension portion. Replacing the first extension portion with the second extension portion comprises connecting at least one of the brake line extension, the electrical line extension, the pneumatic line extension, and the hydraulic line extension of the second extension portion.

BRIEF DESCRIPTION OF THE DRAWINGS

A more complete and thorough understanding of the particular embodiments and advantages thereof may be acquired by referring to the following description taken in conjunction with the accompanying drawings, in which like reference numbers indicate like features, and wherein:

FIG. 6A is an overhead schematic of an example modular top container;

FIG. 6B is a side view schematic of an example modular top container;

FIG. 7A is an overhead schematic of a common underframe, according to some embodiments;

FIG. 7B is a side view schematic of a common underframe, according to some embodiments;

FIG. 9A is an overhead schematic of a female portion of a coupler apparatus, according to some embodiments;

FIG. 9B is a cross-section schematic of a female portion of a coupler apparatus, according to some embodiments;

FIG. 9C is a side view schematic of a female portion of a coupler apparatus, according to some embodiments;

FIG. 9D is another cross-section schematic of a female portion of a coupler apparatus, according to some embodiments;

FIG. 15A is an overhead schematic of a common underframe with an adjustable extension between truck centers, according to some embodiments;

FIG. 15B is a side view schematic of a common underframe with an adjustable extension between truck centers, according to some embodiments;

FIG. 15C is another overhead schematic of a common underframe with an adjustable extension between truck centers, according to some embodiments;

FIG. 15D is another side view schematic of a common underframe with an adjustable extension between truck centers, according to some embodiments;

DETAILED DESCRIPTION

Railcars are generally classified by families, or types of cars, such as gondola, boxcar, hopper car, flatcar, etc. Within each family, particular railcars may be optimized for a specific commodity. Each car design may use a unique design of the undercarriage, even though many of the components, such as trucks and brake systems, are essentially the same.

Figure 1:
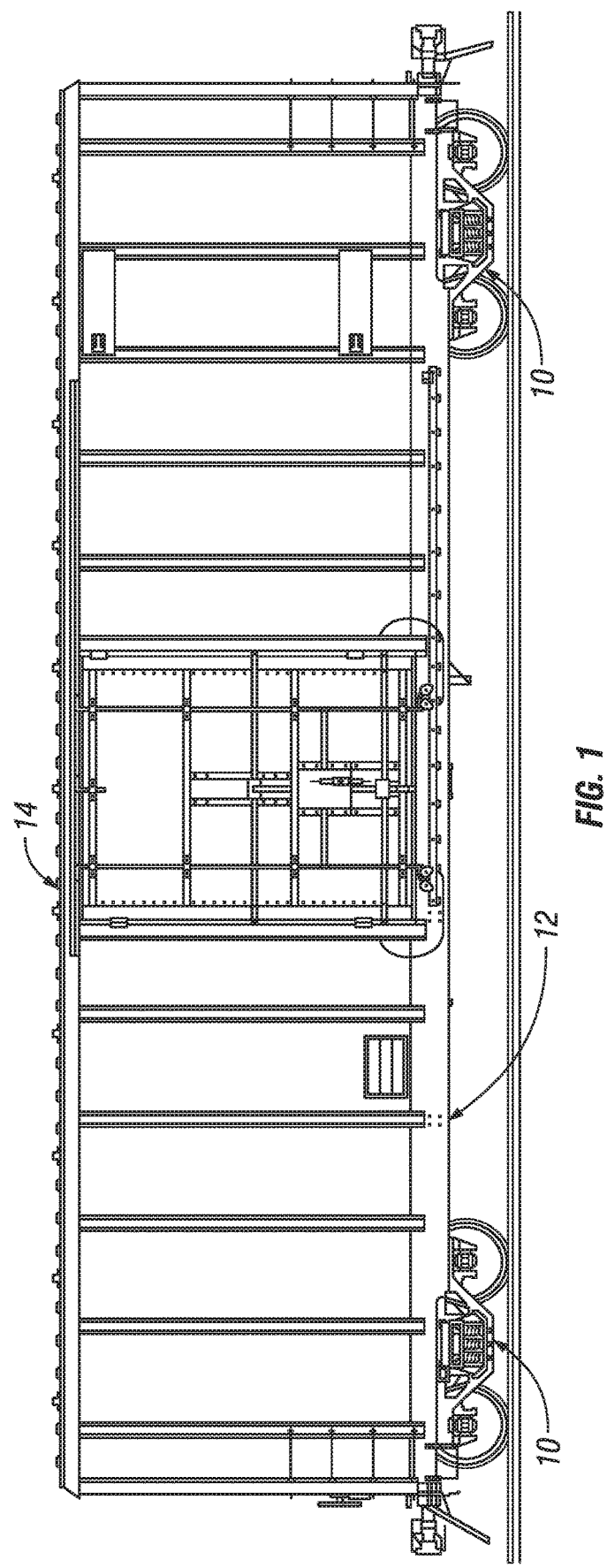
FIG. 1 is a schematic side view of an example boxcar.

FIG. 1 is a schematic side view of an example boxcar. The boxcar includes truck assemblies 10, underframe 12, and box 14. Box 14 generally carries freight. Various boxcars may have doors of varying size and operation. Boxcars may be optimized for carrying a wide range of loads such as palletized cement, auto parts, paper, cellulose pulp, and many other goods, which may result in boxcars of varying length and/or load bearing capacity.

Figure 2:
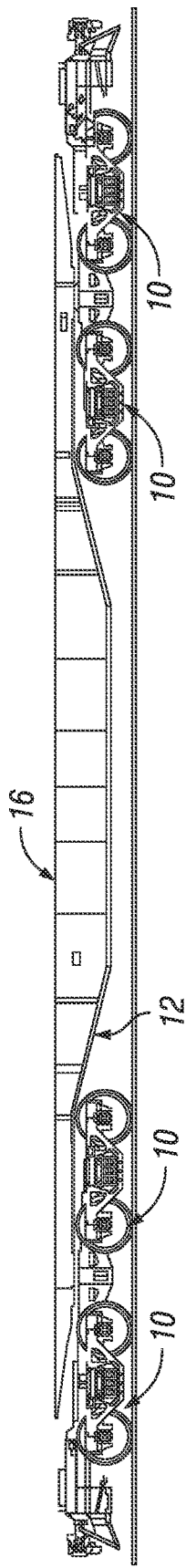
FIG. 2 is a schematic side view of an example flatcar.

FIG. 2 is a schematic side view of an example flatcar. The flatcar includes truck assemblies 10, underframe 12, and deck 16. Deck 16 may transport heavy or large loads, such as machinery, equipment, containers, etc. The flatcar may transport loads that are too large or cumbersome to load in enclosed railcars, such as boxcars.

Figure 3:
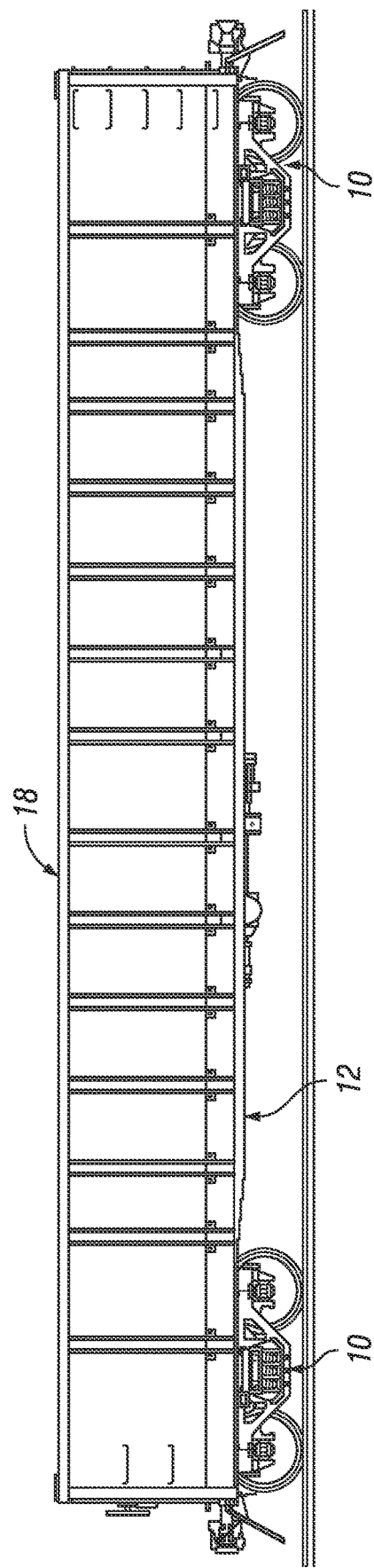
FIG. 3 is a schematic side view of an example gondola car.

FIG. 3 is a schematic side view of an example gondola car. The gondola car includes truck assemblies 10, underframe 12, and gondola 18. Gondola 18 includes an open top for loading/unloading loose bulk materials. Gondola cars may be optimized for transporting various ladings such as scrap metal, construction debris, gravel, and many other materials, which may result in gondola cars of varying length and/or load bearing capacity.

As illustrated in FIGS. 1-3, each of the railcar types includes common systems. For example, each railcar type includes truck assemblies 10, underframe 12, and other common parts, such as brake systems, that are not specifically identified in the figures.

As market conditions change for various commodities, the railcar body requirements may change to accommodate the commodities. The railcar bodies, however, are integral to the rest of the railcar. Thus, a rail operator may have to take an entire railcar out of service because its design is not efficient for current market commodities. Many railcars are designed to last 50 to 65 years.

A particular problem is that some railcars may prematurely be taken out of service because the railcar body may not match current market needs. The rest of the railcar, however, remains usable, which results in inefficiency and waste.

Particular embodiments obviate the problems described above and include a common underframe that may be coupled to a plurality of different top containers. The common underframe structure meets or exceeds Association of American Railroad (AAR) and other regulatory requirements provided for railcar families. Various railcar bodies may be swapped onto the common underframe, which facilitates a fast response and reduced cost when adapting to changing commodity markets. Multiple railcar body designs may be used on a common underframe structure to maximize flexibility, which facilitates efficient use of many common railcar components while providing efficient railcar bodies to optimize shipping of commodities.

In some embodiments, a railcar underframe structure comprising trucks, brakes, through or center sill, and couplers may accommodate a variety of railcar lengths and weights. Various railcar bodies can easily attach to the common underframe structure. The various bodies can be quickly changed to accommodate changing market commodities or specialized customer requirements. This results in full utilization of the railcar underframe structure and components, while also providing great flexibility for railcar capacity, size, etc.

Using a common undercarriage, the railcar body can be changed to align with commodity utilization cycles (typically 5-15 years) while the underframe structure may be used for its full life of 30 or more years. This can reduce the cost of providing an efficient railcar, sized for current market commodities, by as much as 25-35%

Particular embodiments and their advantages are best understood by reference to FIGS. 4 through 17, wherein like reference numbers indicate like features. Some figures may include dimensions or other specifications. The illustrated dimensions or specifications are examples, and other embodiments may include different dimensions or specifications.

Figure 4:
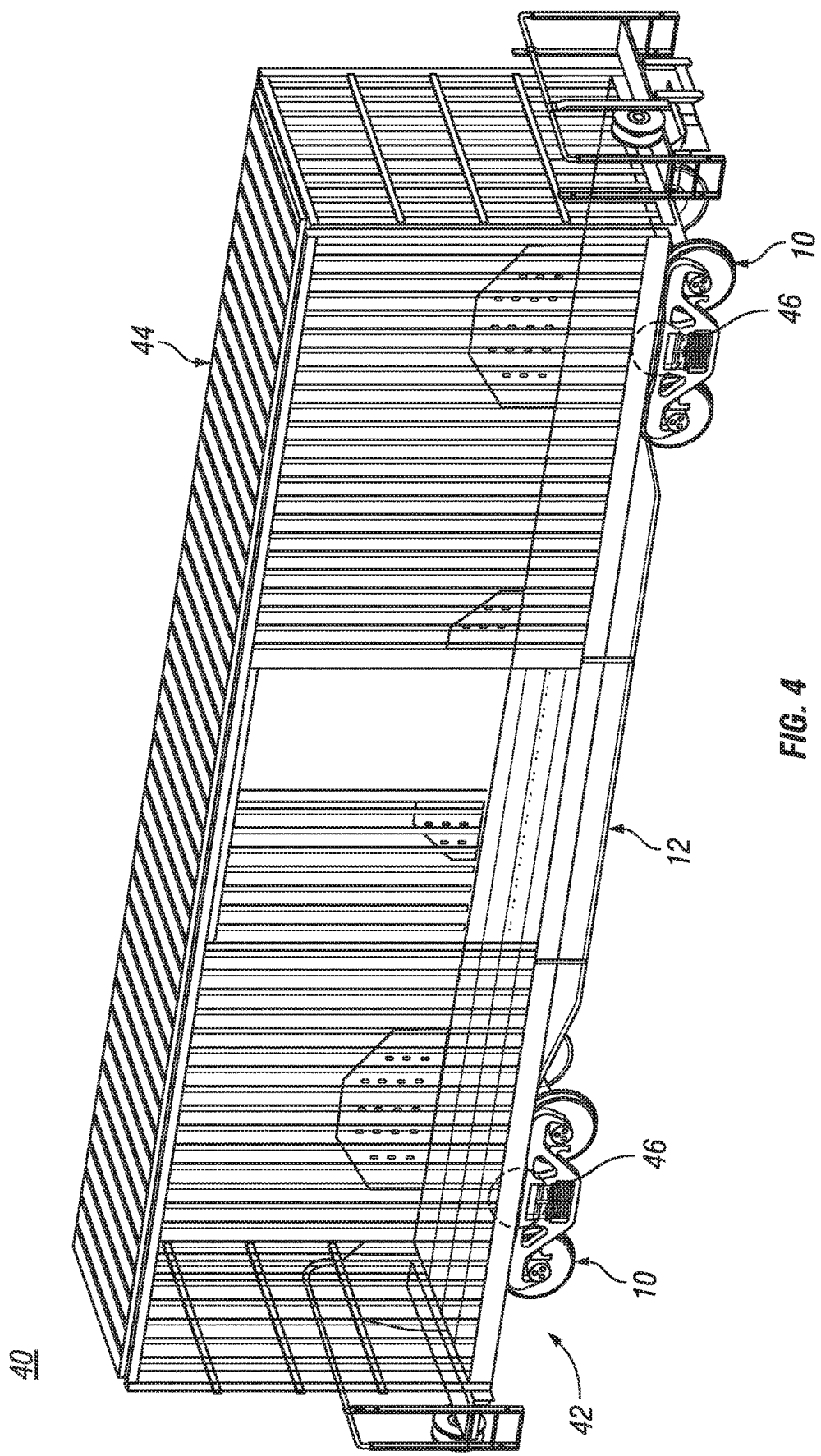
FIG. 4 is a perspective schematic of a modular railcar with a common underframe and a particular top container, according to some embodiments.

FIG. 4 is a perspective schematic of a modular railcar with a common underframe and a particular top container, according to some embodiments. Modular railcar 40 includes common underframe 42 and modular top container 44. Common underframe 42 includes common components such as trucks 10, underframe 12 (which may comprise a center sill), and other common components such as brake systems, ladders, handrails, etc.

Modular top container 44 is coupled to common underframe 42 via one or more coupler apparatus 46 (the details of coupler apparatus 46 are not visible in FIG. 4, but coupler apparatus 46 are located between underframe 42 and top container 44 at one or more locations such as those illustrated by dashed circles 46). Examples of coupler apparatus 46 are described in more detail with respect to FIGS. 8-13. Although two coupler apparatus 46 are illustrated in FIG. 4, particular embodiments may include any suitable number of coupler apparatus 46. For example, the other side of modular railcar 40 (not visible in illustration) may also include two or more coupler apparatus 46.

Particular embodiments may include additional coupler apparatus 46 spaced along the length of railcar 40. For example, common underframe 42 may include a first group of coupler apparatus 46 disposed to align with a modular top container of a first length. Common underframe 42 may include a second group of coupler apparatus 46 disposed to align with a modular top container of a second length, shorter than the first length. The first group of coupler apparatus 46 may go unused when common underframe 42 is coupled to a modular top container of the second length. The second group of coupler apparatus 46 may go unused when common underframe 42 is coupled to a modular top container of the first length. In some embodiments, the position of coupler apparatus 46 may vary transversely across common underframe 42 to accommodate various width modular top containers. Other ways to accommodate different size modular top containers by extending common underframe 42 are described with respect to FIGS. 15A-16C.

Figure 5A:
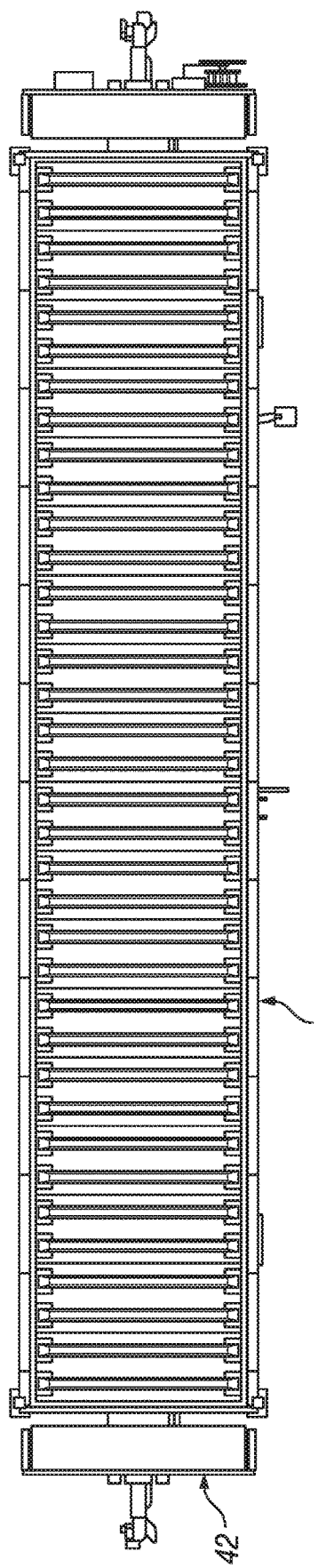
FIG. 5A is an overhead schematic of a modular railcar with a common underframe and a particular top container.
Figure 5B:
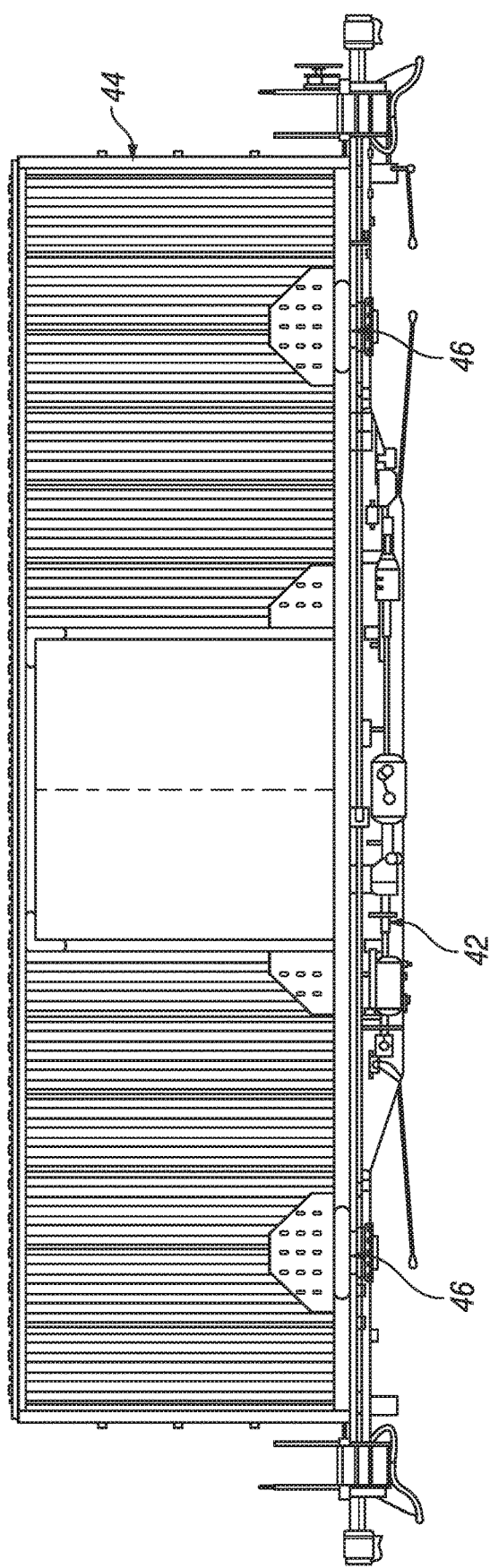
FIG. 5B is a side view schematic of a modular railcar with a common underframe and a particular top container, according to some embodiments.
Figure 5C:
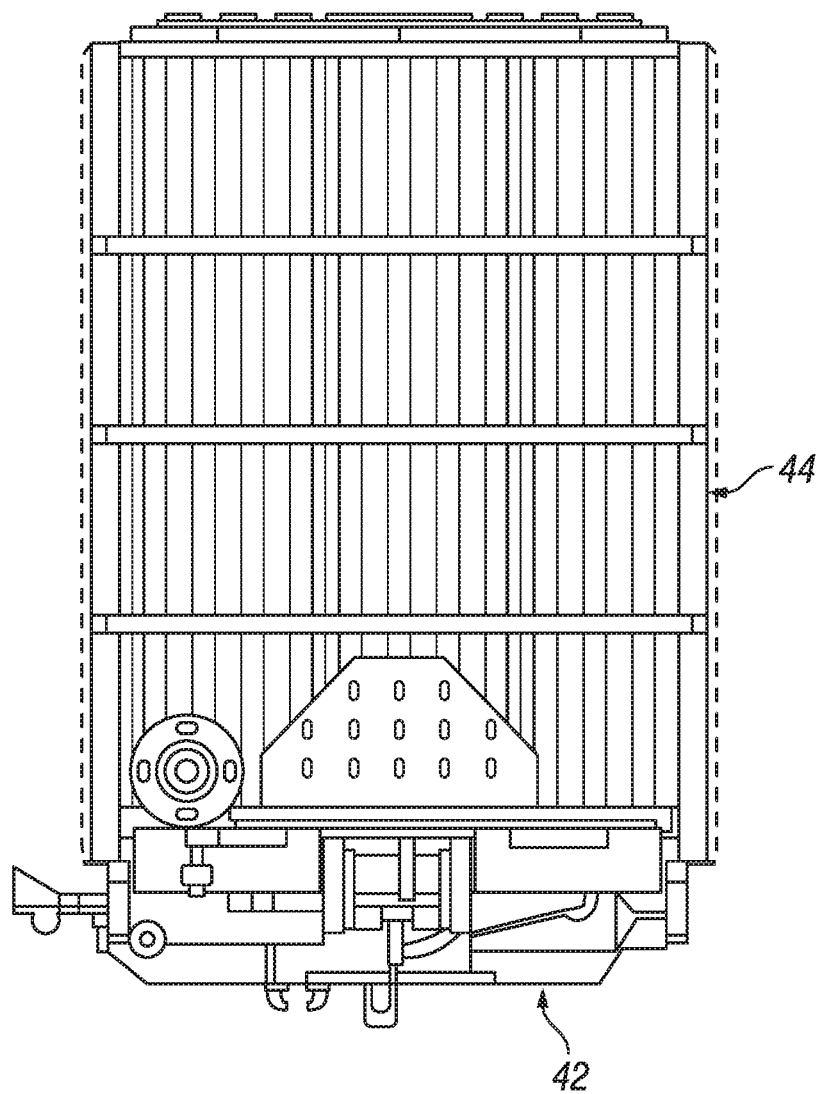
FIG. 5C is an end view schematic of a modular railcar with a common underframe and a particular top container, according to some embodiments.

FIG. 5A is an overhead schematic of a modular railcar with a common underframe and a particular top container. FIG. 5B is a side view schematic of a modular railcar with a common underframe and a particular top container, according to some embodiments. FIG. 5C is an end view schematic of a modular railcar with a common underframe and a particular top container, according to some embodiments. Common underframe 42 and modular top container 44 are similar to those described with respect to FIG. 4.

Figure 6C:
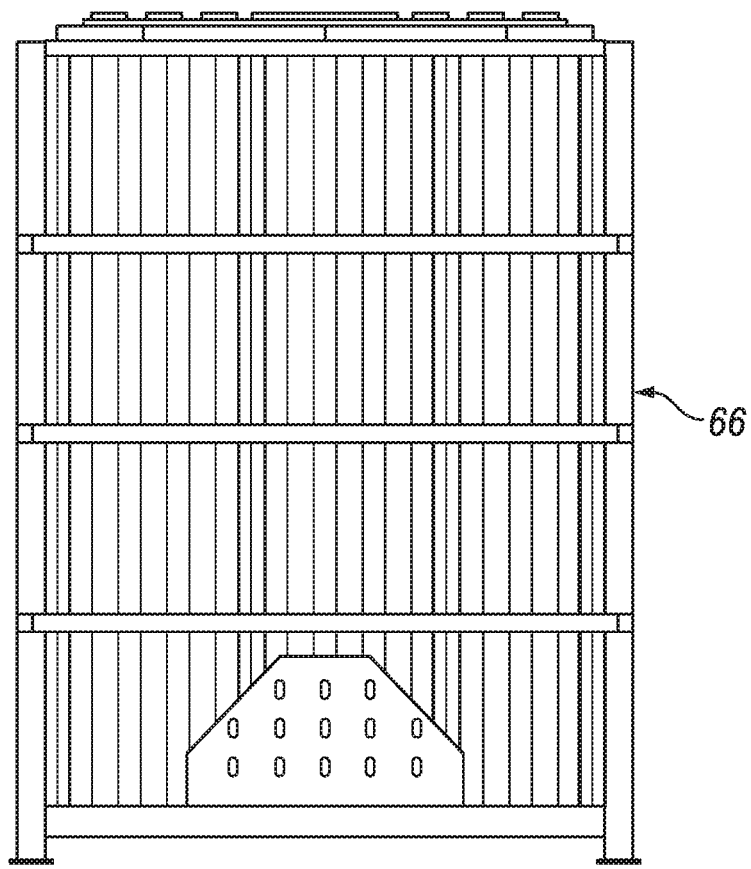
FIG. 6C is an end view schematic of an example modular top container.

FIG. 6A is an overhead schematic of an example modular top container. FIG. 6B is a side view schematic of an example modular top container. FIG. 6C is an end view schematic of an example modular top container. Modular top container 44 is similar the modular top container described with respects to FIG. 4.

The illustrated modular top container in FIGS. 6A-6C comprises an enclosed container (or box-type container). In particular embodiments, the enclosed container includes roof panel 62, side panel 64, floor panel 65, and end panel 66. Particular embodiments may include one or more doors 70.

Modular top container 44 may be constructed with different components depending on the intended cargo of freight to be transported in modular top container 44. For example, the ruggedness of support materials and wall panels, and the number and placement of reinforcements (e.g., reinforcements 68) may vary based on intended cargo.

In particular embodiments, modular top container 44 may comprise a container capable of a 200,000-pound gross load capacity or more. Modular top container 44 may be lifted (e.g., via crane) from or to the common underframe fully loaded (i.e., modular top container 44 is not dependent upon the common underframe for structural integrity). Modular top container 44 may have a gross load capacity greater than standard International Standards Organization (ISO) intermodal containers.

Door 70 may comprise a sliding door or any other suitable railcar door. Modular top container 44 may include any suitable number of doors 70.

Although FIGS. 6A-6C illustrate a particular modular top container, other embodiments include other types of modular top containers. For example, modular top containers may include containers with similar functions as specialty boxcars (e.g., refrigerated boxcar, insulated boxcar, etc.), flat cars, gondola cars, coil steel cars, tank cars, hopper cars, and any other suitable type of railcar.

FIG. 7A is an overhead schematic of a common underframe, according to some embodiments. FIG. 7B is a side view schematic of a common underframe, according to some embodiments. The common underframe is similar to the common underframe described with respect to FIG. 4.

Common underframe 42 illustrated in FIGS. 7A and 7B includes center sill 80, truck bolsters 82, cross braces 84, and end platforms 86. Truck bolsters 82 and cross braces 84 may collectively be referred to as cross members. Other embodiments may have a different configuration of components and/or more or less components than the illustrated configuration.

Common underframe 42 may transport various modular top containers 44 (e.g., FIGS. 6A-6C). Common underframe 42 with fully loaded modular top container 44 is capable of full AAR interchange. An empty common underframe 42 (i.e., no modular top container 44 attached) is also capable of full AAR interchange. The common underframe is not dependent upon any modular top container for structural integrity. The common underframe may be transported without being coupled to a modular top container.

Thus, a modular railcar may transport a first modular top container to a first location where the first modular top container is removed. The railcar may be transported empty (i.e., common underframe only) to a second location where a second modular top container is coupled to the common underframe for transport to a third location.

Common underframe 42 is coupled to various modular top containers via a plurality of coupler apparatus 46, as illustrated in FIG. 4. In particular embodiments, the common underframe carries a majority of the train action loads, and the modular top container carries a majority of the lading load (and a minimum of the train action load).

For example, in particular embodiments coupler apparatus 46 comprises a sliding or friction slip coupler to minimize transfer of action load from common underframe 42 to modular top container 44. Some examples are described in more detail with respect to FIGS. 8-13F.

Figure 8:
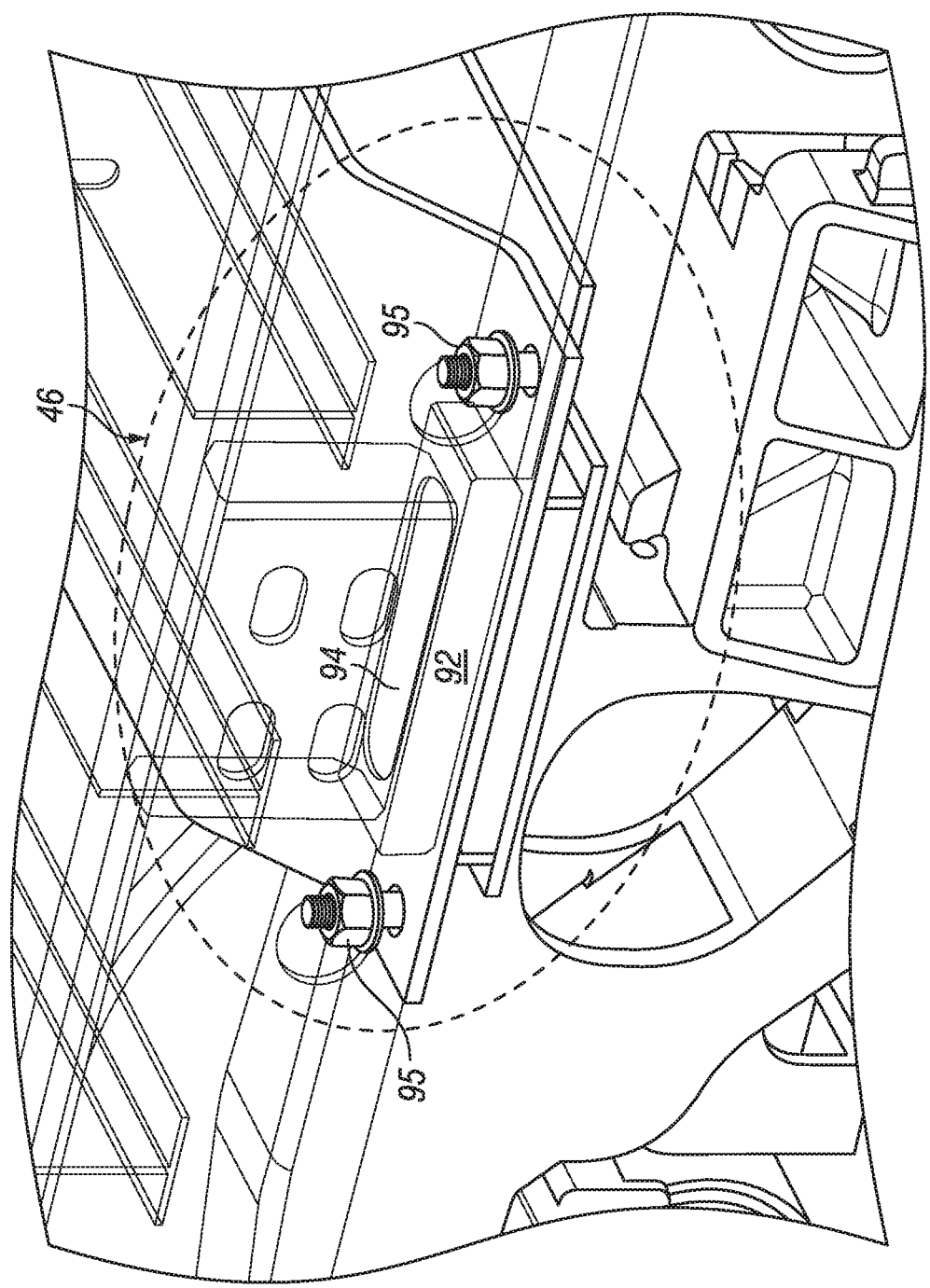
FIG. 8 is a perspective schematic of a coupler apparatus coupling a common underframe and a modular top container, according to some embodiments.

FIG. 8 is a perspective schematic of a coupler apparatus coupling a common underframe and a modular top container, according to some embodiments. In some embodiments, coupler apparatus 46 comprises female portion 92 (i.e., recessed portion) coupled to the modular top container and male portion 94 (i.e. protruding portion) coupled to the common underframe.

In operation, when the modular top container is lowered onto the common underframe, male portion 94 slides into female portion 92. In particular embodiments, male portion 94 may be between $1/16$ to 1 inch smaller than the opening in female portion 92, which facilitates slippage (longitudinally and/or transversely) between the modular top container and the common underframe. The slippage prevents or reduces action loads from transferring to the modular top container from the common underframe. Similarly, the slippage prevents lading loads from transferring from the modular top container to the common underframe.

Under normal operating conditions, the weight of modular top container is enough to keep male portion 94 coupled to female portion 92. Particular embodiments may include one or more fasteners 95. In the illustrated example, female portion 92 is disposed within a channel along the bottom edges of the modular top container. In other embodiments, female portion 92 may be disposed at any suitable location on the modular top container. In some embodiments, the male and female portions may be reversed (i.e., female portion 92 may be coupled to the common underframe and male portion 94 may be coupled to the modular top container).

Fastener 95 may comprise a nut and bolt, or any other suitable fastener. One or more fasteners 95 prevent or resist separation of the modular top container from the common underframe under particular conditions, such as an emergency condition like a derailment. Fastener 95 may be installed through slots to facilitate the slippage (longitudinally and/or transversely) between the modular top container and the common underframe. When fasteners 95 are disposed within the modular top container, openings in the exterior of the modular top container provide quick access to fasteners 95 to facilitate coupling and decoupling.

FIG. 9A is an overhead schematic of a female portion of a coupler apparatus, according to some embodiments. Female coupler portion 92 includes opening 96 for receiving the male coupler portion. Female coupler portion 92 may comprise steel or any other suitable material.

FIG. 9B is a cross-section schematic of a female portion of a coupler apparatus, according to some embodiments. The illustrated cross-section is viewed from the line labeled A-A in FIG. 9A.

FIG. 9C is a side view schematic of a female portion of a coupler apparatus, according to some embodiments.

FIG. 9D is another cross-section schematic of a female portion of a coupler apparatus, according to some embodiments. The illustrated cross-section is viewed from the line labeled B-B in FIG. 9C.

Figure 10C:
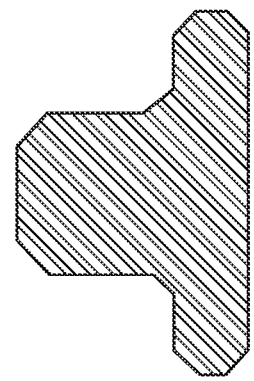
FIG. 10C is a cross-section schematic of a male portion of a coupler apparatus, according to some embodiments.
Figure 10A:
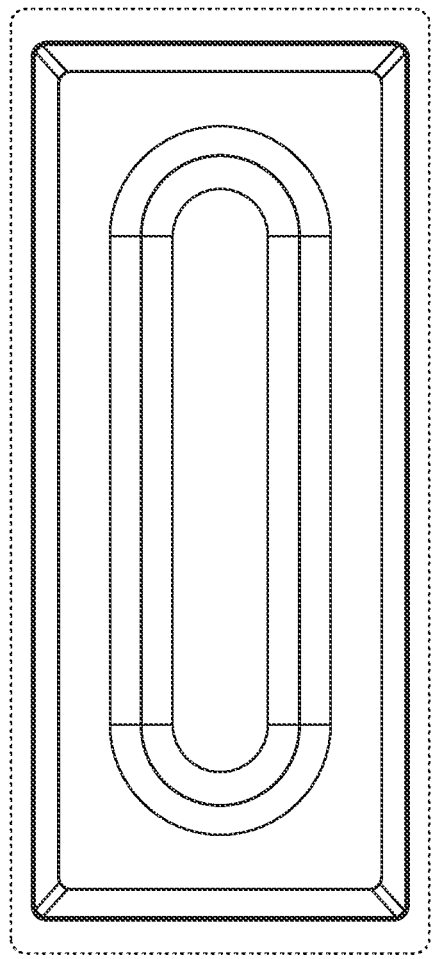
FIG. 10A is an overhead schematic of a male portion of a coupler apparatus, according to some embodiments.

FIG. 10A is an overhead schematic of a male portion of a coupler apparatus, according to some embodiments. Male coupler portion 94 may comprise steel or any other suitable material. Male coupler portion 94 is sized to fit within opening 96 of female coupler portion 92. In particular embodiments, male portion 94 may be between $1/16$ to 1 inch smaller than opening 96, which facilitates slippage (longitudinally and/or transversely) between the modular top container and the common underframe.

Figure 10B:
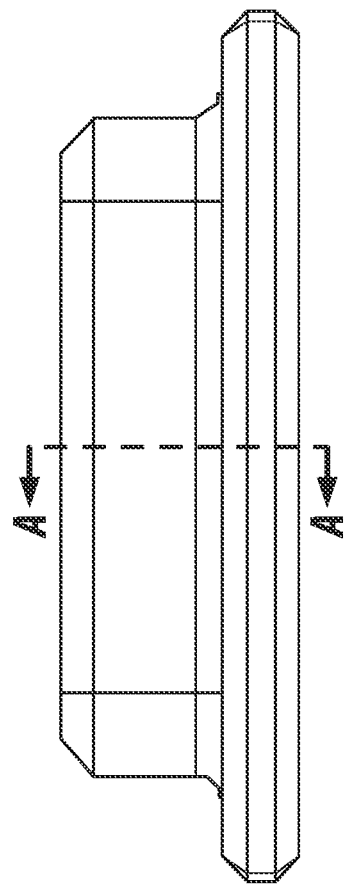
FIG. 10B is a side view schematic of a male portion of a coupler apparatus, according to some embodiments.

FIG. 10B is a side view schematic of a male portion of a coupler apparatus, according to some embodiments.

FIG. 10C is a cross-section schematic of a male portion of a coupler apparatus, according to some embodiments. The illustrated cross-section is viewed from the line labeled A-A in FIG. 10B.

FIGS. 8-10C illustrate one example of a coupler apparatus. Another example is illustrated in FIGS. 11-13F.

Figure 11:
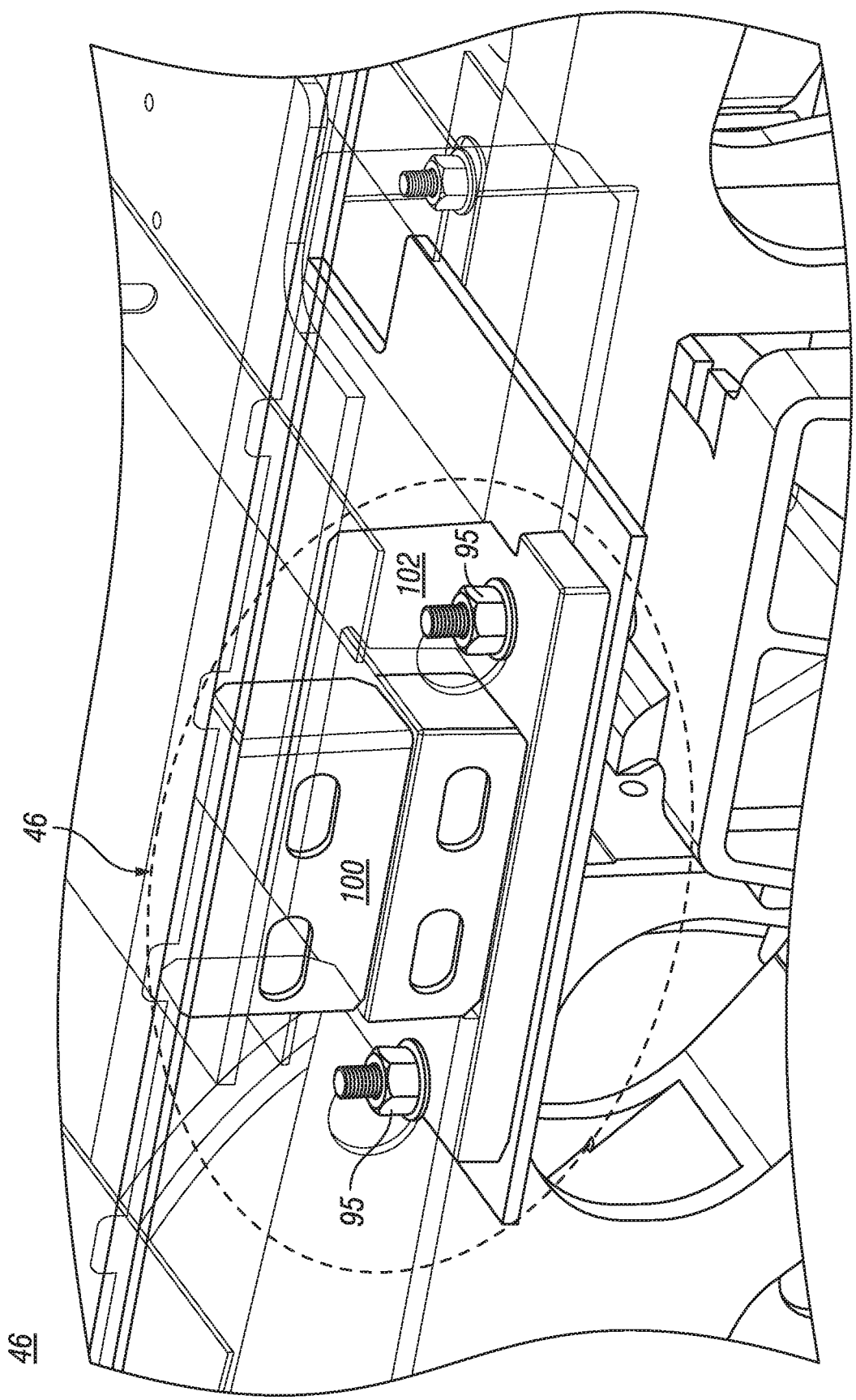
FIG. 11 is a perspective schematic of another coupler apparatus coupling a common underframe and a modular top container, according to some embodiments.

FIG. 11 is a perspective schematic of another coupler apparatus coupling a common underframe and a modular top container, according to some embodiments. In some embodiments, coupler apparatus 46 comprises female portion 102 coupled to the common underframe and male portion 100 coupled to the modular top container. In the illustrated example, female portion 102 comprises a U-shaped opening. The U-shaped opening restricts movement of male portion 100.

In operation, when the modular top container is lowered onto the common underframe, male portion 100 slides into female portion 102. In particular embodiments, male portion 100 may be between 1/16 to 1 inch smaller than the U-shaped section of female portion 102, which facilitates slippage (longitudinally and/or transversely) between the modular top container and the common underframe. The slippage prevents or reduces action loads from transferring to the modular top container from the common underframe. Similarly, the slippage prevents lading loads from transferring from the modular top container to the common underframe.

In the illustrated example, the U-shape of female portion 102 only prevents movement transversely in one direction. A similar coupler apparatus 46 on the opposite side of the railcar prevents movement transversely in the other direction.

Particular embodiments may include one or more fasteners 95 similar to those described with respect to FIG. 8. In some embodiments, the male and female portions may be reversed (i.e., female portion 102 may be coupled to the common underframe and male portion 100 may be coupled to the modular top container).

Figure 12A:
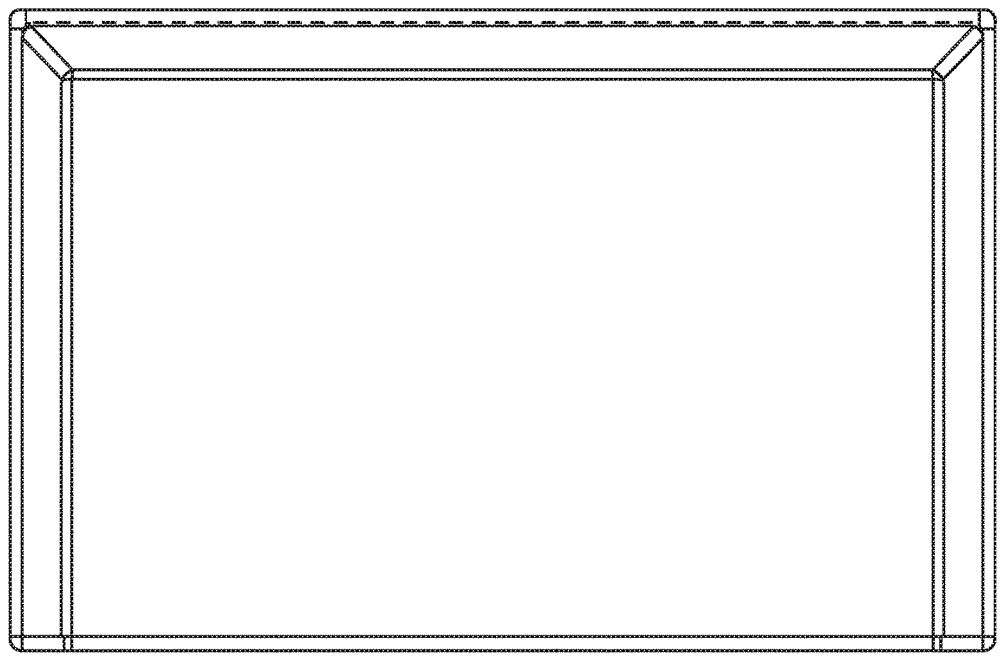
FIG. 12A is an overhead schematic of a male portion of a coupler apparatus, according to some embodiments.
Figure 12B:
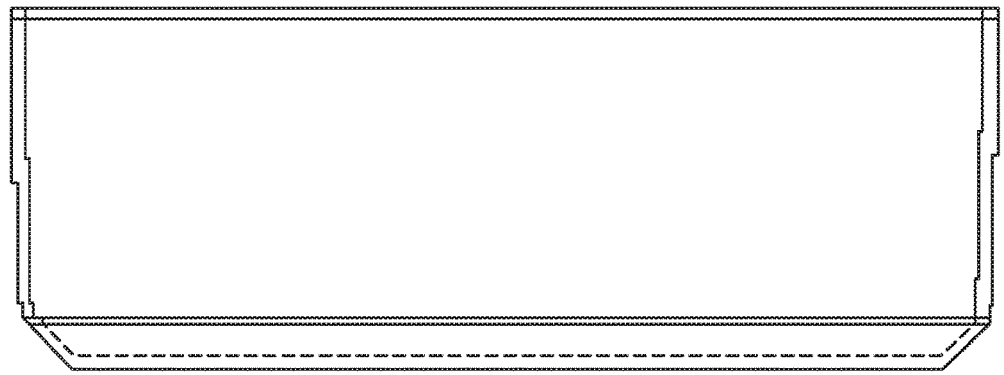
FIG. 12B is a side view schematic of a male portion of a coupler apparatus, according to some embodiments.
Figure 12C:
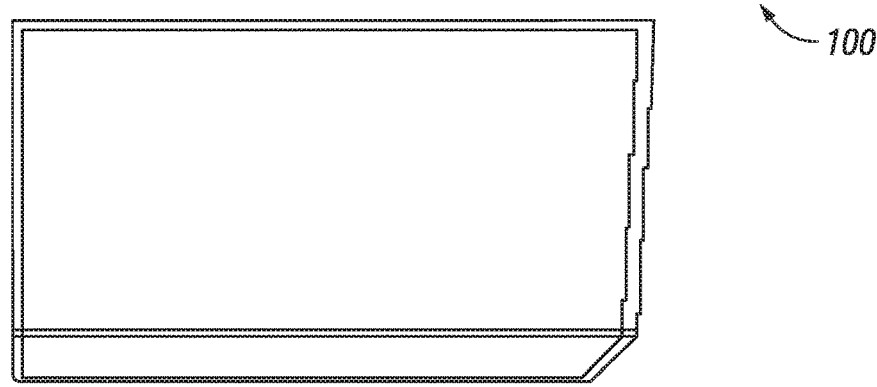
FIG. 12C is an end view schematic of a male portion of a coupler apparatus, according to some embodiments.

FIG. 12A is an overhead schematic of a male portion of a coupler apparatus, according to some embodiments. Male coupler portion 100 may comprise steel or any other suitable material. FIG. 12B is a side view schematic of a male portion of a coupler apparatus, according to some embodiments. FIG. 12C is an end view schematic of a male portion of a coupler apparatus, according to some embodiments.

Figure 13D:
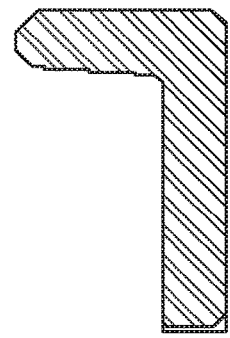
FIG. 13D is another cross-section schematic of a female portion of a coupler apparatus, according to some embodiments.
Figure 13E:
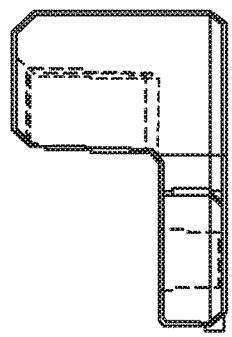
FIG. 13E is an end view schematic of a female portion of a coupler apparatus, according to some embodiments.
Figure 13F:
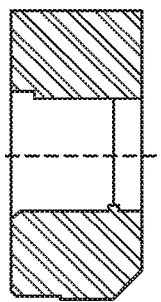
FIG. 13F is another cross-section schematic of a female portion of a coupler apparatus, according to some embodiments.
Figure 13A:
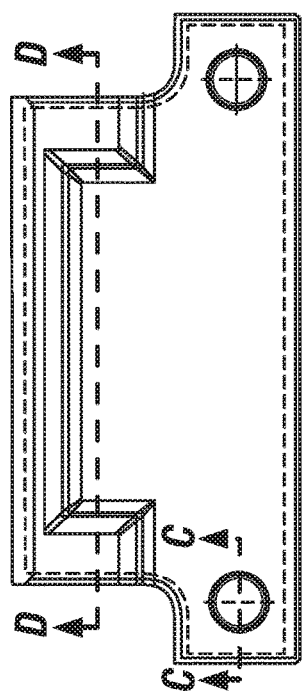
FIG. 13A is an overhead schematic of a female portion of a coupler apparatus, according to some embodiments.
Figure 13B:
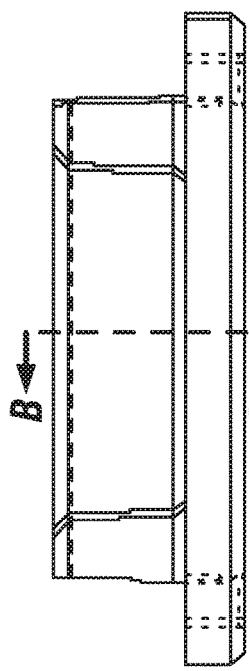
FIG. 13B is a side view schematic of a female portion of a coupler apparatus, according to some embodiments.

FIG. 13A is an overhead schematic of a female portion of a coupler apparatus, according to some embodiments. Female coupler portion 102 may comprise steel or any other suitable material. FIG. 13B is a side view schematic of a female portion of a coupler apparatus, according to some embodiments.

Figure 13C:
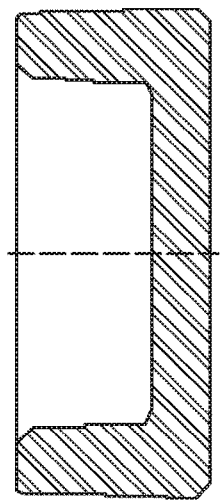
FIG. 13C is a cross-section schematic of a female portion of a coupler apparatus, according to some embodiments.

FIG. 13C is a cross-section schematic of a female portion of a coupler apparatus, according to some embodiments. The illustrated cross-section is viewed from the line labeled D-D in FIG. 13A. FIG. 13D is another cross-section schematic of a female portion of a coupler apparatus, according to some embodiments. The illustrated cross-section is viewed from the line labeled B-B in FIG. 13B.

FIG. 13E is an end view schematic of a female portion of a coupler apparatus, according to some embodiments. FIG. 13F is another cross-section schematic of a female portion of a coupler apparatus, according to some embodiments. The illustrated cross-section is viewed from the line labeled C-C in FIG. 13A.

In some embodiments, the coupler apparatus may comprise a first portion coupled to the common underframe. A second portion may comprise an adapter that couples the first portion to a standard ISO intermodal container. For example, the modular top container may comprise an ISO intermodal container. The coupler apparatus may include a standard inter-box connector to connect to the corner fittings of an intermodal container and male/female portions as described above for coupling the inter-box connector to the common underframe.

Although particular types of coupler apparatus are illustrated and described herein, other embodiments may include variations and/or modifications to the coupler apparatus. Particular embodiments may include two or more different types of coupler apparatus on one modular railcar. Particular locations of the coupler apparatus on the modular railcar may vary.

Figure 14:
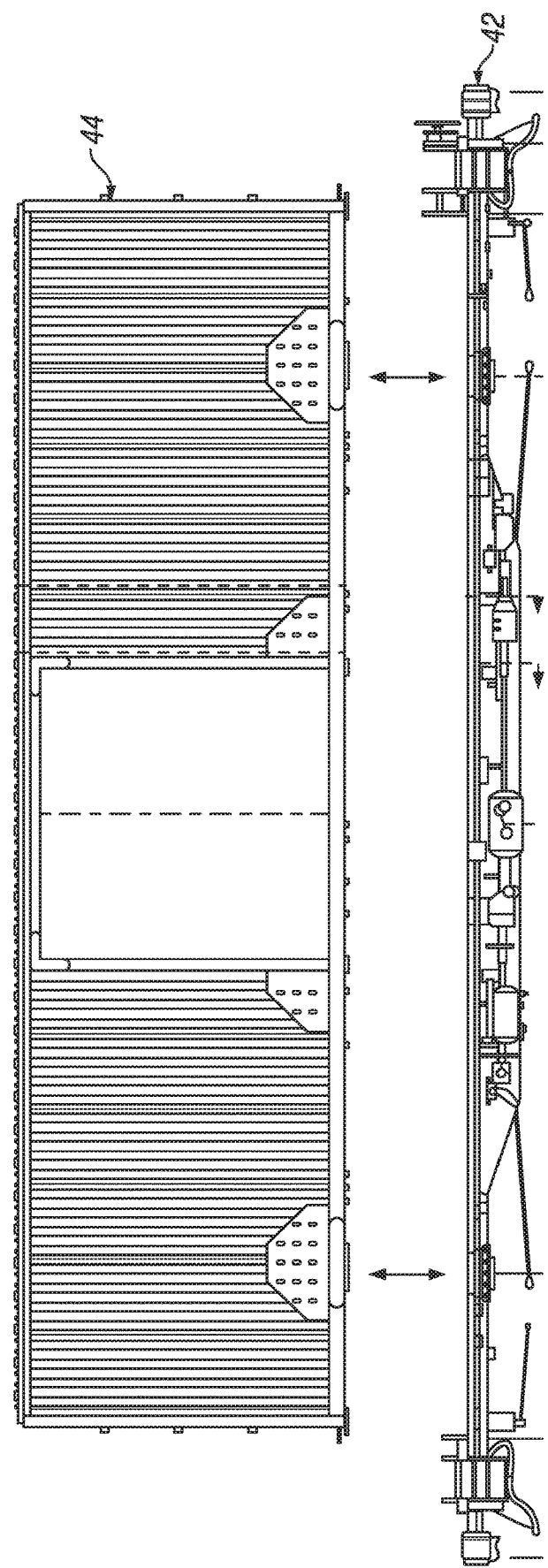
FIG. 14 is side view of a modular top container being coupled/decoupled with a common underframe.

FIG. 14 is side view of a modular top container being coupled/decoupled with a common underframe. As described above, common underframe 42 and modular top container 44 are structurally independent from each other. Modular top container 44 may be loaded onto or removed from common underframe 42 either empty or fully loaded. Common underframe 42 may be transported with or without a modular top container.

In operation, a railyard operator may use a crane, hoist, or any other suitable equipment or machinery to couple or decouple a modular top container of the modular railcar. Assembly of the modular railcar is relatively fast because the railyard operator aligns the male and female portions of the coupler apparatus and lowers the modular top container onto the common underframe. The railyard operator then connects the fasteners associated with each coupler apparatus.

Disassembly is also relatively fast. The railyard operator disconnects the fasteners associated with each coupler apparatus, and then lifts the modular top container off of the common underframe. In some embodiments, assembly and disassembly may be performed within thirty minutes, for example.

In particular embodiments, the length of the common underframe may be modified to accommodate various lengths, sizes, and family types of the modular top container. Varying the length of the common underframe may adjust the distance between truck centers. An example is illustrated in FIGS. 15A-15D FIG. 15A is an overhead schematic of a common underframe with an adjustable extension between truck centers, according to some embodiments. In particular embodiments, common underframe 42 includes extension 110.

Extension 110 comprises a structural extension of center sill 80. Extension 110 may comprise a drop-in section of center-sill. For example, extension 110 may comprise a ten-foot section (or any other suitable length) of center sill that may be coupled (e.g., bolted, welded, pinned, keyed, etc.) between the A and B ends of common underframe 42.

In some embodiments, extension 110 includes extensions for additional components of common underframe 42. For example, extending the length of common underframe 42 may include extending brake lines, electrical lines, pneumatic lines, hydraulic lines, etc. Extension 110 may include extension lines and couplers for extending one or more of the additional components described above.

FIG. 15B is a side view schematic of a common underframe with an adjustable extension between truck centers, according to some embodiments.

FIG. 15C is another overhead schematic of a common underframe with an adjustable extension between truck centers, according to some embodiments. Common underframe 42 is similar to common underframe 42 described with respect to FIG. 15A, except that extension 110b is a different length than extension 110a. In some embodiments, extension 110b may longer than extension 110a, which increases the distance between truck centers of common underframe 42.

FIG. 15D is another side view schematic of a common underframe with an adjustable extension between truck centers, according to some embodiments.

Although extension 110 is illustrated as a single module in the illustrated examples, in some embodiments extension110 may comprise one or more extension modules to achieve a particular length of extension. For example, a five-foot extension may be combined with a ten-foot extension to create a fifteen-foot extension. In some embodiments, the A and B ends of the common underframe may be coupled directly to each other, without an extension between them.

Varying the length of the common underframe facilitates transportation of various types of modular top containers. For example, a 60-foot box-type modular top container may be changed to a 72-foot box-type modular top container by removing the 60-foot box-type modular top container from the common underframe, extending the length of the common underframe by increasing the distance between truck centers using an extension, and then installing a 72-foot box-type modular top container onto the extended common underframe. An example is illustrated in FIGS. 16A-16C.

Figure 16A:
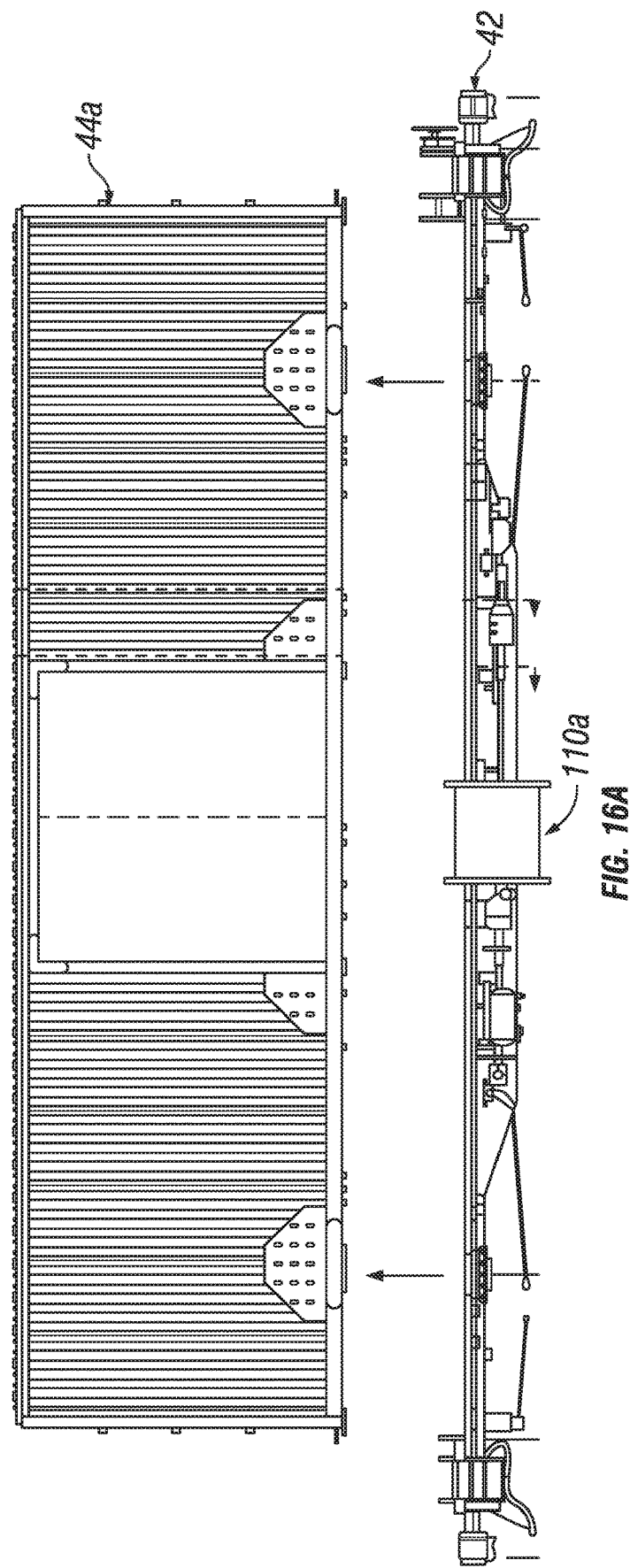
FIG. 16A is a side view of a modular top container of a first length, according to some embodiments, being decoupled from a common underframe of a first length.

FIG. 16A is a side view of a modular top container of a first length, according to some embodiments, being decoupled from a common underframe of a first length. For example, modular top container 44a may comprise a 60-foot box-type modular top container. Common underframe 42 may include extension 110a. Extension 110a comprises a first length so that the coupler apparatus of common underframe 42 and modular top container 44a are aligned. To change types of modular top containers, modular top container 44a may be decoupled from (e.g., lifted off) common underframe 42.

Figure 16B:
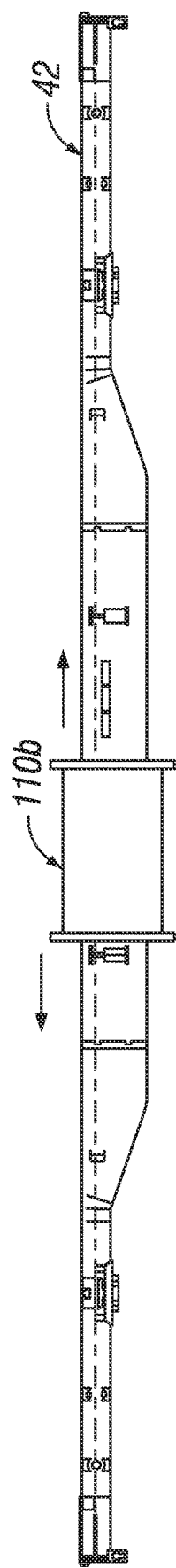
FIG. 16B is a side view illustrating lengthening of a common underframe, according to some embodiments.

FIG. 16B is a side view illustrating lengthening of a common underframe, according to some embodiments. For example, extension 110a may be removed and replaced with extension 110b. Extension 110b may increase the length of common underframe 42. Extension 110b may align the coupler apparatus of common underframe 42 and a 72-foot box-type modular top container.

Figure 16C:
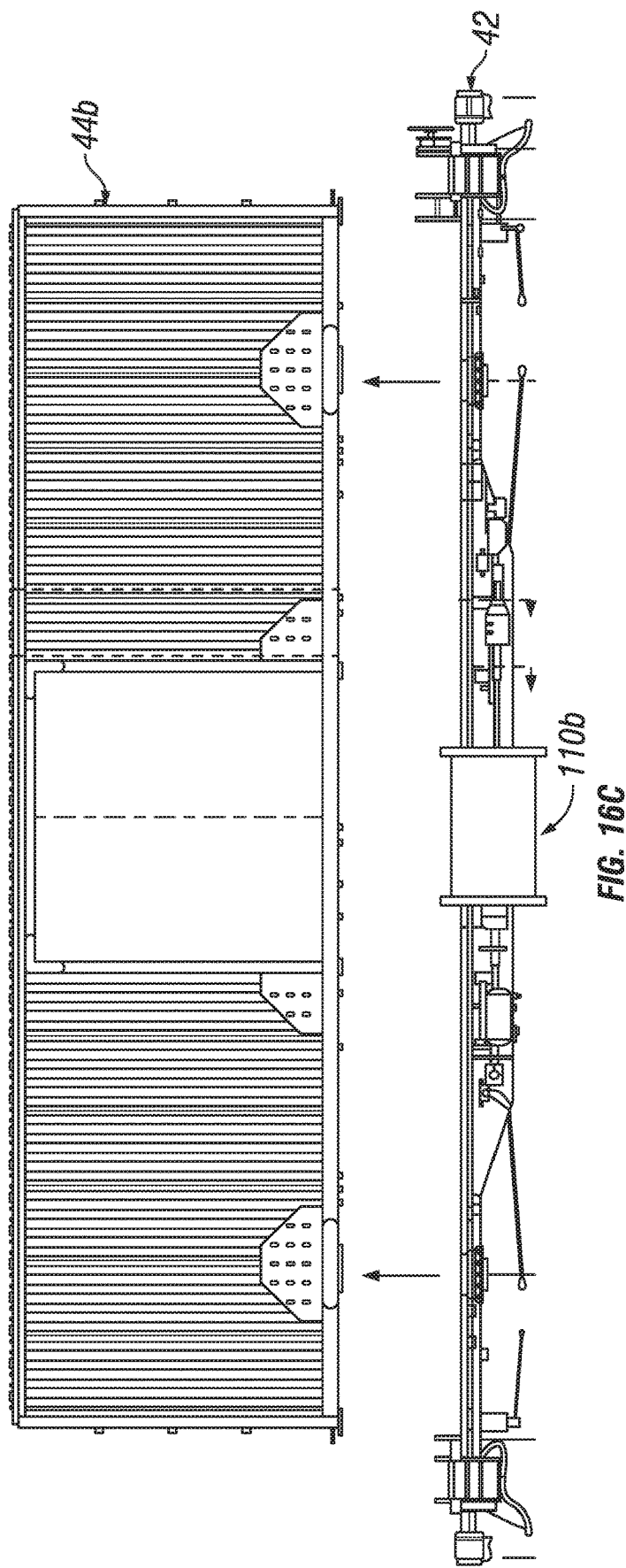
FIG. 16C is a side view of a modular top container of a second length, according to some embodiments, being coupled to a common underframe of a second length.

FIG. 16C is a side view of a modular top container of a second length, according to some embodiments, being coupled to a common underframe of a second length. For example, modular top container 44b may comprise a 72-foot box-type modular top container. Common underframe 42 may include extension 110b. Extension 110b comprises a second length so that the coupler apparatus of common underframe 42 and modular top container 44b are aligned. Modular top container 44b may be coupled to (e.g., lowered onto) common underframe 42.

In one example, the box-type modular top container may be extendible. For example, a 60-foot box may be lengthened to a 72-foot box by use of extensions (not illustrated). Although particular embodiments describe lengthening the common underframe and/or modular top container with respect to particular dimensions, one of skill in the art will understand that other lengths may be used, and that modular railcars may be shortened using a similar process. For example, an extension may be removed from the common underframe and/or modular top container, and a longer or shorter extension may be substituted in its place.

In a similar method, the railcar may be changed from one family type to another. Different railcar family types may have different truck center distances. In one embodiment, a box-type modular top container may be removed from the common underframe, the common underframe may be lengthened or shortened as appropriate, and a different type of modular top container may be attached to the common underframe. In one embodiment, a box-type modular top container may be removed, the common underframe truck centers may be revised to a different distance, and a gondola-type modular top container may be added to the common underframe. Persons with knowledge of railcars appreciate that many varieties of railcar families and undercarriage length adjustments may be accommodated.

Figure 17:
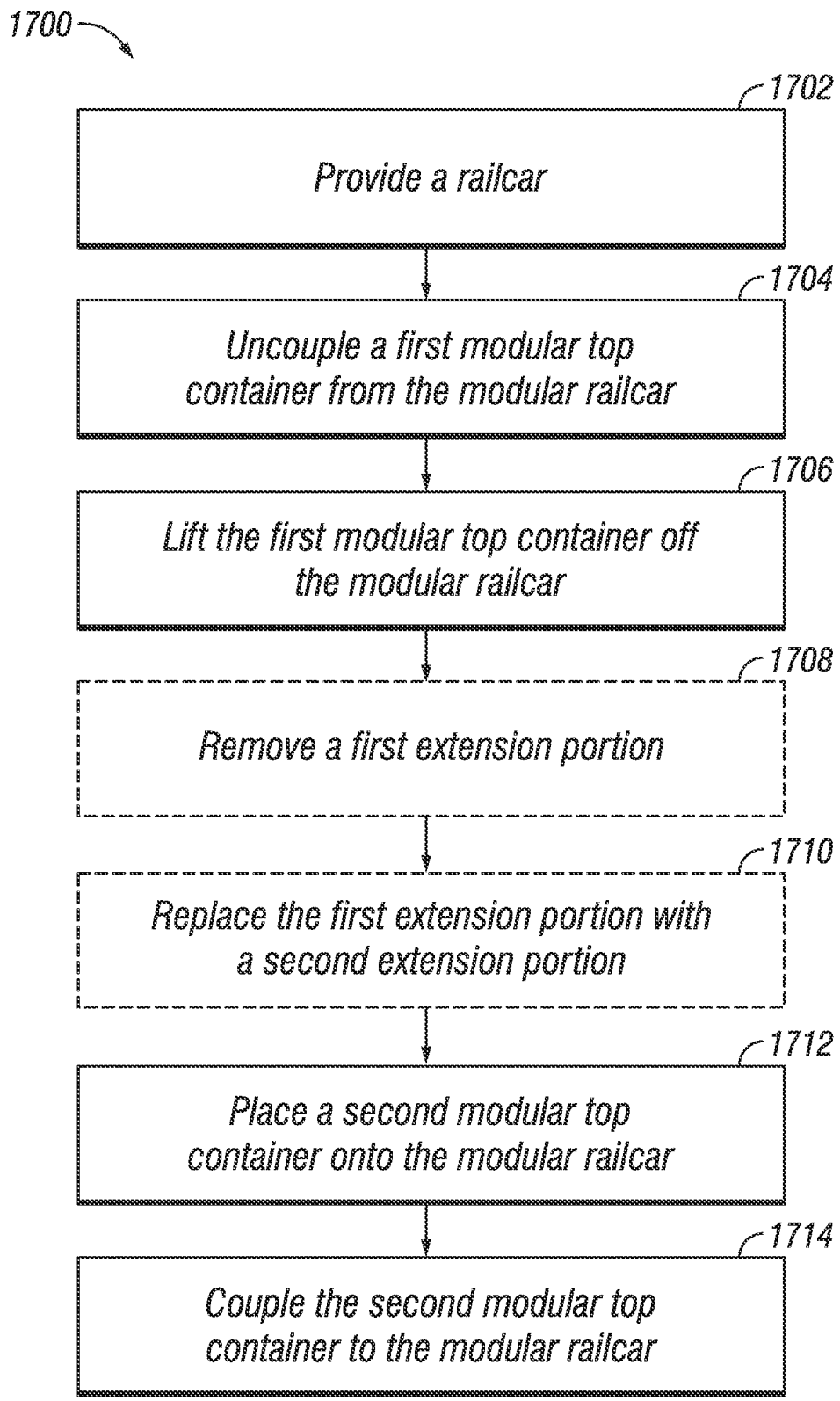
FIG. 17 is a flow diagram illustrating an example method of coupling a modular railcar and a modular top container, according to some embodiments.

FIG. 17 is a flow diagram illustrating an example method of coupling a modular railcar and a modular top container, according to some embodiments. In particular embodiments, one of more steps of FIG. 17 may be performed suing components described with respect to FIGS. 4-16C.

The method begins at step 1702. Step 1702 comprises providing a railcar. The railcar comprises a modular railcar and a first modular top container such as those described above with respect to FIGS. 4-16C.

Step 1704 comprises uncoupling the first modular top container from the modular railcar. For example, a railyard operator may unbolt the first modular top container from the modular railcar. In other embodiments, the railyard operator may disengage any suitable mechanical fastener coupling the first modular top container to the modular railcar.

Step 1706 comprises lifting the first modular top container off the modular railcar. For example, a railyard operator may use a crane, hoist, or any other suitable equipment or machinery to lift the first modular top container off the modular railcar. The modular top container may be lifted from or to the modular railcar fully loaded (i.e., the modular top container is not dependent upon the modular railcar for structural integrity).

In some embodiments the modular railcar may comprise multiples subsets of coupling apparatus. Each subset may be located at different positions on the modular railcar and may correspond to different sized modular top containers. In those embodiments, the method may continue to step 1712, skipping steps 1708 and 1710. In other embodiments, the modular railcar may be shortened or lengthened depending on the requirements of the second modular top container to be loaded onto the modular railcar. An example is illustrated in steps 1708 and steps 1710.

Step 1708 comprises removing a first extension portion. For example, an extension portion may be removed as described above with respect to FIGS. 15A-16C.

Step 1710 comprises replacing the first extension portion with a second extension portion. The second extension portion comprises a different length than the first extension portion. Accordingly, the truck spacing may be increased or decreased by using different length extensions.

Step 1712 comprises placing a second modular top container onto the modular railcar. The second modular top container is different than the first modular top container. For example, the second modular top container may be a different size or may be the same size but constructed to transport heavier or lighter loads. The second modular top container may comprise a different container type, such as one of a box car, refrigerated box car, hopper car, gondola car, etc. A railyard operator may use a crane, hoist, or any other suitable equipment or machinery to place the second modular top container onto the modular railcar.

Step 1714 comprises coupling the second modular top container to the modular railcar. For example, a railyard operator may bolt the second modular top container to the modular railcar. In other embodiments, the railyard operator may engage any suitable mechanical fastener to couple the second modular top container to the modular railcar.

Modifications, additions, or omissions may be made to the method illustrated in FIG. 17. Additionally, one or more steps in the method may be performed in parallel or in any suitable order.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components.

Although embodiments of the present disclosure and their advantages have been described in detail, it should be understood that various changes, substitutions and alternations can be made herein without departing from the spirit and scope of the invention.

The invention claimed is:

1. A modular railcar comprising:
a pair of trucks disposed near each end of the modular railcar;
an underframe coupled to the pair of trucks and supported by the pair of trucks; and
the underframe comprising a plurality of coupling apparatus, the plurality of coupling apparatus configured to couple a modular top container to the underframe;
wherein each coupling apparatus of the plurality of coupling apparatus comprises a protruding portion configured to couple with a recessed portion of a modular top container and the protruding portion of each coupling apparatus is smaller than a corresponding recessed portion of the modular top container facilitating movement of the modular top container with respect to the underframe.

2. The modular railcar of claim 1, wherein:
the underframe comprises a center sill and one or more cross members coupled to the center sill; and
each coupling apparatus of the plurality of coupling apparatus is disposed on the one or more cross members.

3. The modular railcar of claim 1, wherein the plurality of coupling apparatus comprises a first subset of coupling apparatus disposed to couple a first type of top container to the underframe and a second subset of coupling apparatus disposed to couple a second type of top container to the underframe.

4. The modular railcar of claim 1, wherein each coupling apparatus of the plurality of coupling apparatus is configured to couple to a corner fitting of an international standards organization (ISO) intermodal shipping container.

5. The modular railcar of claim 1, wherein the underframe comprises:
a first underframe portion coupled to a first truck of the pair of trucks;
a second underframe portion coupled to a second truck of the pair of trucks; and
a removable extension portion coupling the first underframe portion to the second underframe portion.

6. The modular railcar of claim 5, wherein the removable extension portion further comprises at least one of a brake line extension, an electrical line extension, a pneumatic line extension, and a hydraulic line extension.

7. A modular top container for use with a modular railcar, the modular top container comprising:
a floor panel configured to transport a lading; and
a plurality of coupling apparatus coupled to the floor panel, the plurality of coupling apparatus configured to couple the modular top container to a modular railcar, wherein each coupling apparatus of the plurality of coupling apparatus comprises a recessed portion and the recessed portion is smaller than a corresponding protruding portion of the modular railcar facilitating movement of the modular top container with respect to the modular railcar; and
wherein the floor panel is configured to support the weight of the lading when detached from the modular railcar.

8. The modular top container of claim 7, further comprising a pair of side panels and a pair of end panels coupled to the floor panel, and wherein the floor panel, the pair of side panels, and the pair of end panels are configured to support the weight of the lading when detached from the modular railcar.

9. The modular top container of claim 8, further comprising a roof panel.

10. The modular top container of claim 8, further comprising one or more doors.

11. A method of coupling a modular top container and a modular railcar, the method comprising:
providing a railcar, the railcar comprising:
a modular railcar comprising:
a pair of trucks disposed near each end of the modular railcar;
an underframe coupled to the pair of trucks and supported by the pair of trucks;
the underframe comprising a plurality of coupling apparatus, the plurality of coupling apparatus coupling a first modular top container to the modular railcar;
the first modular top container comprising:
a floor panel configured to transport a lading; and
a plurality of coupling apparatus coupled to the floor panel, the plurality of coupling apparatus coupling the modular top container to the modular railcar;
wherein the floor panel is configured to support the weight of the lading when detached from the modular railcar; and
wherein each coupling apparatus of the plurality of coupling apparatus comprises a protruding portion configured to couple with a recessed portion of the modular top container and the protruding portion of each coupling apparatus is smaller than a corresponding recessed portion of the modular top container facilitating movement of the modular top container with respect to the underframe;
uncoupling the first modular top container from the modular railcar;
lifting the first modular top container off the modular railcar;
placing a second modular top container onto the modular railcar; and
coupling the second modular top container to the modular railcar.

12. The method of claim 11, wherein uncoupling the first modular top container from the modular railcar comprises unbolting the first modular top container from the modular railcar, and coupling the second modular top container to the modular railcar comprises bolting the second modular top container to the modular railcar.

13. The method of claim 11, wherein the first modular top container is a different length than the second modular top container.

14. The method of claim 11, wherein the first modular top container is a different type of container than the second modular top container.

15. The method of claim 11, wherein:

the underframe of the modular railcar comprises:
- a first underframe portion coupled to a first truck of the pair of trucks;
- a second underframe portion coupled to a second truck of the pair of trucks; and
- a first extension portion coupling the first underframe portion to the second underframe portion, the first extension portion comprising a first length;

and the method further comprises:
- removing the first extension portion; and
- replacing the first extension portion with a second extension portion, the second extension portion comprising a second length.

16. The method of claim 15, wherein:

the first extension portion and the second extension portion each comprise at least one of a brake line extension, an electrical line extension, a pneumatic line extension, and a hydraulic line extension;

removing the first extension portion comprises disconnecting at least one of the brake line extension, the electrical line extension, the pneumatic line extension, and the hydraulic line extension of the first extension portion; and replacing the first extension portion with the second extension portion comprises connecting at least one of the brake line extension, the electrical line extension, the pneumatic line extension, and the hydraulic line extension of the second extension portion.

* * * * *